July 26, 1960 N. J. REGNIER ET AL 2,946,945
SOLAR ENERGY CONVERTING APPARATUS OR THE LIKE
Filed March 11, 1958 2 Sheets-Sheet 1

NORMAN J. REGNIER
LAWRENCE W. SCHMIDT
DONN E. KEFES
INVENTORS

BY

ATTORNEY

July 26, 1960 N. J. REGNIER ET AL 2,946,945
SOLAR ENERGY CONVERTING APPARATUS OR THE LIKE
Filed March 11, 1958 2 Sheets-Sheet 2
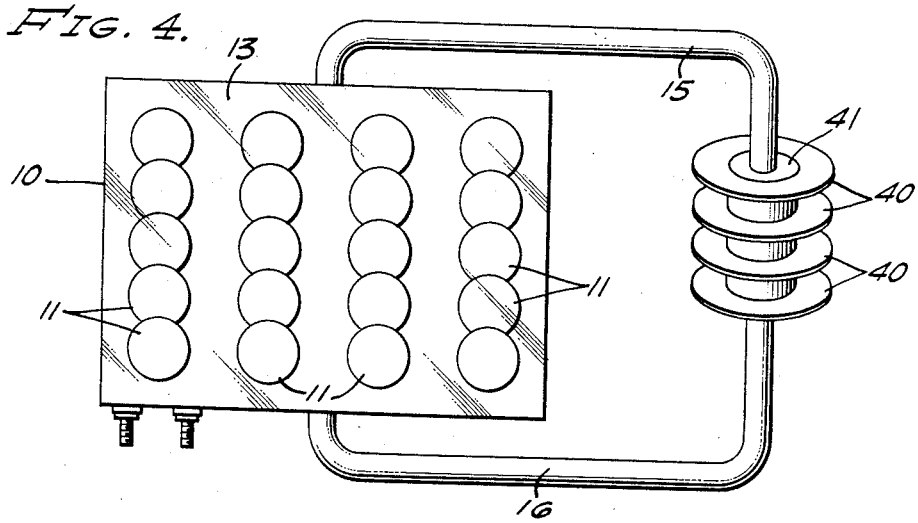
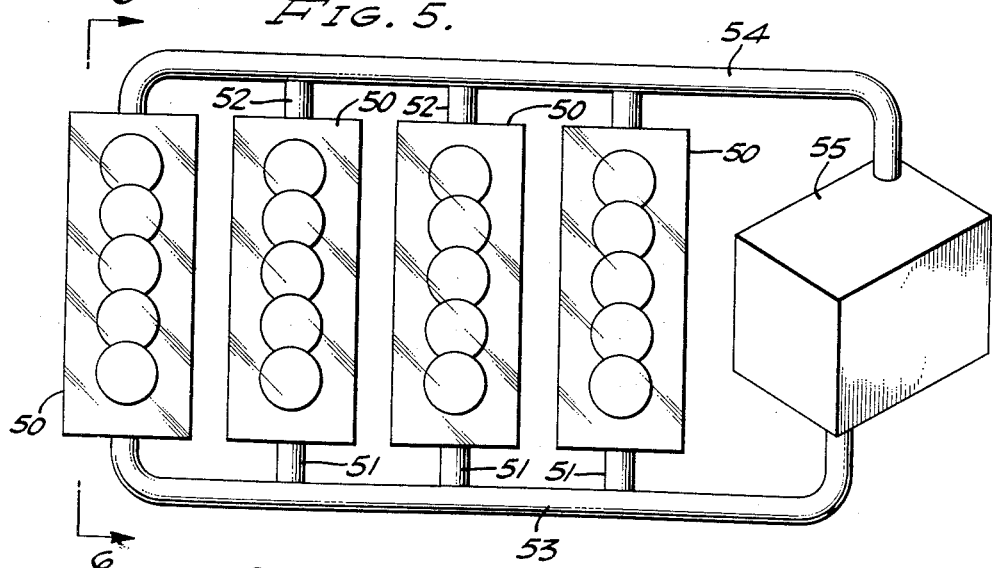
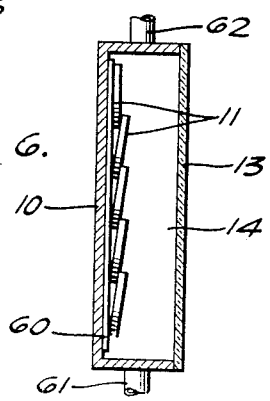
NORMAN J. REGNIER
LAWRENCE W. SCHMIDT
DONN E. KEFES
INVENTORS
BY
ATTORNEY

United States Patent Office 2,946,945
Patented July 26, 1960

2,946,945
SOLAR ENERGY CONVERTING APPARATUS OR THE LIKE

Norman J. Regnier, Lawrence W. Schmidt, and Donn E. Kefes, Los Angeles, Calif., assignors to Hoffman Electronics Corporation, a corporation of California Filed Mar. 11, 1958, Ser. No. 720,608

10 Claims. (Cl. 320—2)

This invention relates to improvements in solar energy converters and, more specifically, to a solar energy converter system which simultaneously provides electrical energy and thermal energy.

The development in recent years of the silicon p-n junction solar energy converter has made attractive and economically feasible the application of these converters to the operation of electrical devices of many types particularly when such devices are located in remote regions where access is difficult and expensive. For example, a series-parallel combination of converter elements generating approximately 20 watts of power under full solar illumination has been used successfully by the United States Forest Service in the operation of an automatic radio repeater station which permits the expansion of the radio coverage required by the United States Forest Service for effective protection of our forests. One of the problems encountered with such a converter is that under high insolation the temperatures reached within the capsules containing the silicon converters is very high and, as the temperature of the converters rises, the resistance rises and the electrical power losses in the converters increase. On the other hand, most photoelectric type of installations, such as the one being discussed, require an associated storage battery to store excess power generated in the daytime under full sun illumination for use either at nighttime or on very cloudy days. The efficiency of such storage batteries falls off materially as the temperature drops. It will be desirable to locate such large scale converters on the top of high mountains where extremely low temperatures are attained during the wintertime and it is desirable that the solar energized power supply operate successfully during such periods of low temperature.

Therefore, it is an object of this invention to provide a photoelectric solar energy converter which will retain a relatively high efficiency of performance despite intense insolation.

It is a further object of this invention to provide a solar energized electrical power system which will retain good operating efficiency despite low and high extremes of ambient temperatures.

It is another object of this invention to provide a solar energy converter which will simultaneously provide electrical energy and thermal energy.

According to the present invention, photoelectric energy converters are encapsulated either in basic modules which are interconnected electrically and hydraulically or they are encapsulated en masse, in either case a liquid having low viscosity and good optical properties is introduced into the encapsulations with a hydraulic connection from each module or from the single large encapsulation to an external heat storage and/or transfer device. This heat storage and/or transfer device may perform the function of transferring heat to maintain the temperature of an associated storage device, the converter itself or an associated structure.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which, Figure 1 is a diagram showing one embodiment of the present invention.

Figure 4 is a diagrammatic representation of a cooling system according to the present invention.

Figure 5 is a diagram illustrating an alternative form of Figure 1.

Figure 6 is a cross-sectional view taken along line 6—6 in Figure 5.

Figure 1:
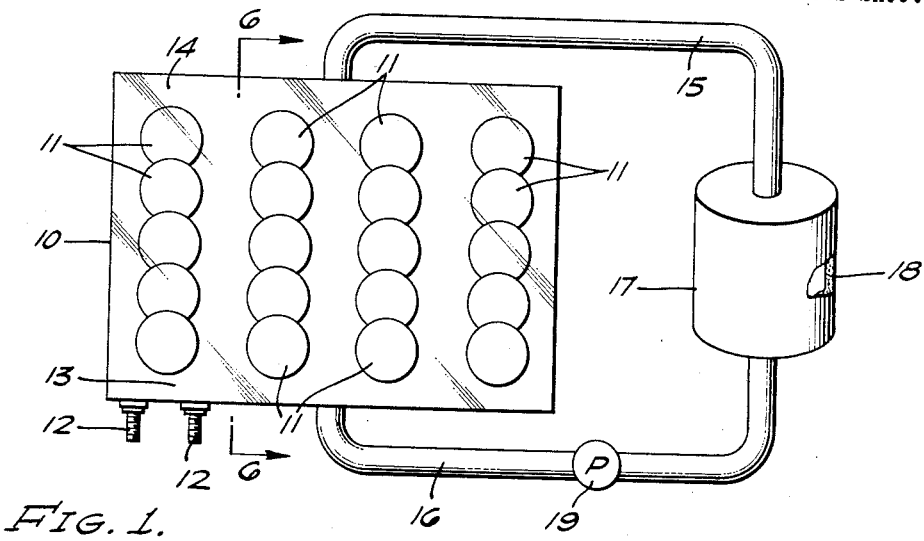
Figure 2:
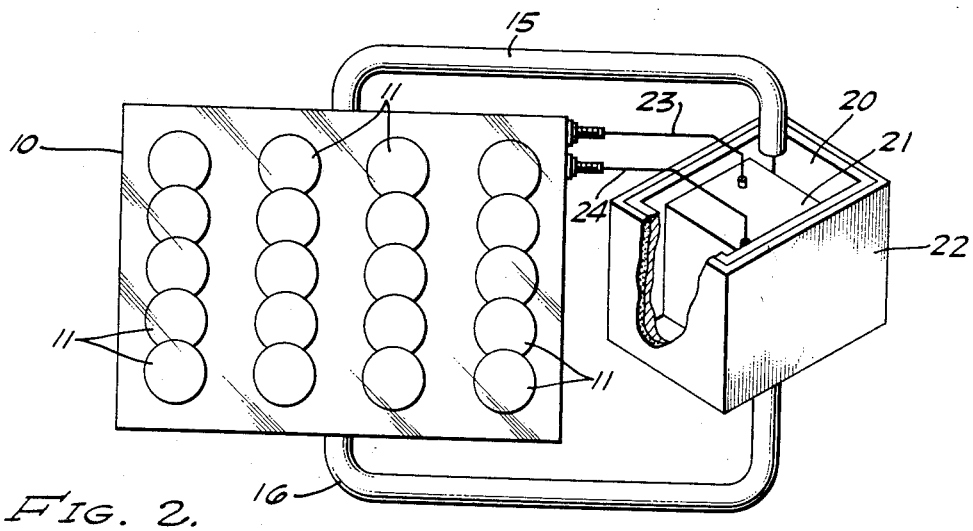
Figure 2 is a diagrammatic representation of another embodiment of the present invention.

In Figure 1, tray 10 contains a plurality of photoelectric converter elements 11 which may be, for example, the silicon p-n junction type of solar energy converter. These elements may be connected in any desired series-parallel configuration to provide the desired voltage and current at terminals 12 to accomplish a series connection as described in co-pending application, Serial No. 595,630, filed July 3, 1956 (Donald C. Dickson, Jr.), assigned to the same assignee as this application. The effect of such overlapping of series-connected converter elements is shown in the cross-sectional view of Figure 6, the cross-section at 6—6 in Figure 5 being the same as the cross-section at 6—6 in Figure 1. A piece of glass or plastic transparent to visible light and short wavelength infrared energy but opaque to long wavelength infrared energy forms cover 13 which extends over the entire tray and is spaced from elements 11. Cover 13 keeps contaminants and debris off the surface of elements 11 and, at the same time, in combination with tray 10, acts to confine heat transferring liquid which is introduced into the system. This heat transferring liquid 14 may be ethylene glycol, alcohol or some other liquid which exhibits good transmissivity in the visible light spectrum and in the short infrared spectrum. At the same time it should have low viscosity over a wide range of temperatures and should not boil at the temperatures expected to be attained within covered tray 10 during insolation. Tray 10 has inlet and outlet ports and associated tubes 15 and 16 connected to a heat reservoir 17 which may be covered by a heavy insulating jacket 18. This insulating jacket may be made removable for summertime operation of the system. At that time it would be desirable to radiate heat from the walls of reservoir 17 rather than retaining it within those walls as is desired under cold temperature conditions.

Where panel 10 is of large area, as where it is in the roof of a building or constitutes a substantial portion of it, reservoir 17 may be placed in the basement of the building, in which case it may be desirable to insert a pump at point 19 in the system to assure circulation of the heated liquid through radiators or the like in the building.

Where the solar energy converter is used in remote places to generate electricity for powering electrical equipment, as in the Forest Service application already described, it is necessary to have a storage device such as a lead-acid battery or a nickel-cadmium battery to provide 24-hour operation of the electrical system. The power available from a storage battery falls off as the ambient temperature falls. In Figure 2 there is shown an adaptation of Figure 1 which will maintain the temperature of the storage battery at a desirable level to assure greater efficiency for the over-all system. In Figure 2 heated liquid from tray 10 is fed through outlet pipe 15 into the walls of a reservoir box 20 which may be shaped closely to the configuration of storage battery 21 which it is intended should be heated. The outer wall of reservoir 20 is heavily insulated to prevent heat loss from the system. This insulation is accomplished by jacket 22 which may be made removable for summertime operation. A top may be provided for the reservoir with openings for connectors 23 and 24.

Figure 3:
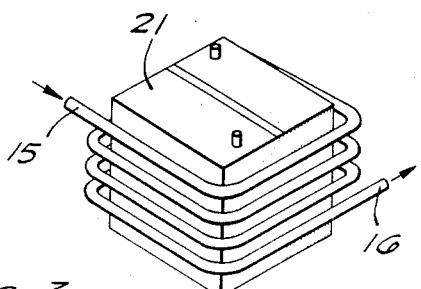
Figure 3 is an illustration of an alternative form of a portion of the structure of Figure 2.

In some installations it may be desirable to simply coil outlet tube 15 from tray 10 around the storage battery returning it through inlet 16 to tray 10. This approach is shown in Figure 3.

In Figure 4 the embodiment of Figure 1 has been modified for summertime operation. In the summertime it is desirable to cool the elements 11 so as to minimize the rise in internal electrical resistance which normally accompanies rising ambient temperatures. By removing insulating jacket 18 from reservoir 17 and applying radiating vanes 40 or by inserting a cooling section 41, carrying such vanes 40, in place of reservoir 17, the desired cooling of the surfaces of elements 11 can be attained. Of course, reservoir 17 or cooling section 41, for this purpose, should be in a shaded area.

In Figure 5 each module 50 comprises a multiplicity of solar-to-electrical energy converters which may be combined in any desired series-parallel relationship, as were elements 11 in Figure 1. Each module encapsulates the converters and provides an inlet port 51 and an outlet port 52 for the heat transferring liquid which may be of the same type described in connection with Figure 1. Each of the inlet ports 51 joins a master feedline 53 and each of the outlet ports 52 joins a master feedline 54. Master feedline 54 feeds heated liquid into reservoir 55 which may be insulated in the same fashion as reservoir 17 in Figure 1. From an electrical standpoint the use of modules is convenient since it permits setting a standard voltage such as 6 volts or 12 volts for each module and then connecting them in parallel to provide the desired current. Reservoir 55 may, in this case, have the configuration of reservoir 20 in Figure 2 so as to be adapted to receive a storage battery.

Figure 6 is a view which would be taken at line 6—6 in either Figure 1 or Figure 5. In Figure 6 tray 10 carries glass or plastic cover 13. Insulating base 60 is secured to tray 10 along the bottom thereof. Converter elements 11 are secured to insulating base 60 by means of adhesive or the like and may be connected in series by the overlapping technique indicated in Figure 6 if the converter elements are of the type described in co-pending application, Serial No. 595,630, filed July 3, 1956 (Donald C. Dickson, Jr.), i.e., the type on which the back side of the converter element is the negative connection and a positive connection is made to a conductive ring or strip on the front portion of the converter. The space between the surface of the converter elements 11 and cover 13 is filled with a heat transfer liquid which has the desired vapor pressure characteristics and viscosity. A material such as ethylene glycol or some of the silicone oils may be utilized. Ideally, the liquid, in addition to having the desired viscosity characteristics, would be inert and also would provide a good optical bond between the surface of elements 11 and cover 13 to minimize reflections at the interfaces. Inlet port 61 and outlet port 62 are provided for connection to the main feedlines or to the reservoir directly.

The conversion from solar energy to thermal energy within the present system is based on the principle of the flat plate collector. Light energy passing through cover 13 comprises photons which bombard surfaces of converter elements 11 producing (in addition to electrical energy) heat in those surfaces and in adjoining surfaces. The frequency of the heat radiation thus produced is, however, sufficiently low so that this energy cannot re-radiate through cover 13. Thus, cover 13 is transparent for light energy and near infrared energy but is opaque at the lower frequency of the heat energy generated within tray 10. This heat energy is trapped within the space defined by cover 13 and tray 10 and in past solar-to-electric energy converters has served only to produce the undesirable result of raising the temperature of the converter elements 11, increasing their internal resistance and power loss.

In the present invention, however, the heat which is trapped in the space defined by the walls of tray 10 and by cover 13 raises the temperature of the heat transfer liquid causing the heated liquid to rise and move through outlet port 15 into its associated pipe. At the same time the heat transfer liquid at lower temperature moves from reservoir 17 through inlet port 16 to be subsequently heated. Thus, a circulating hot liquid system is produced relying upon convection currents which, in turn rely upon gravitational effects. The height of reservoir 17 should approximate the average height of tray 10 to assure circulation where no pump is used.

In addition to utilizing the circulating heated liquid to maintain the desired characteristics of associated storage battery equipment, de-icing and snow melting on the surface of the glass 13 may be effected. If the temperature of the liquid between cover 13 and panel 10 falls below the temperature of the liquid in the reservoir 17, the flow of liquid will reverse direction and the heat stored in reservoir 17 will be transferred, at least in part, to cover 13 raising its temperature sufficiently, in some cases, to melt falling snow or ice which has formed. This will aid in keeping the transmission of light energy to the converter elements 11 at a maximum.

As has been indicated, if the area of tray 10 and cover 13 is sufficiently large, the amount of light energy converted to thermal energy may be sufficient to heat an associated structure. For practical reasons, it is desirable to put the reservoir in the basement of the structure or beneath it in some fashion and in such case it will be necessary to provide a pump which will force the circulation of warm liquid from reservoir 17 into the radiators or other heating devices in the structure.

Thus, there has been provided by this invention apparatus which turns the disadvantages normally accompanying large area solar-to-electric converters to an advantage. The electrical energy obtainable from the system is maintained at a higher level throughout a wide range of temperatures and, at the same time, the thermal energy which is a natural concomitant serves a useful function either in connection with the electrical power system itself or in some less direct application, as by heating the structure which supports the converter.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In combination, a tray containing a fluid, a plurality of photovoltaic cells supported in said tray and having a pair of electrical terminals, a cover transparent to light but substantially opaque to long wavelength infrared energy extending over the surface of said tray and sealed to the edges thereof, said tray having inlet and outlet ports, heat transfer means, and tube means interconnecting said tray and said heat transfer means to provide a continuous path for enabling said fluid to circulate from said outlet port to said heat transfer means, to said inlet port, to said tray, and back to said outlet port.

2. Apparatus according to claim 1 in which said heat transfer means comprises a reservoir and a heat insulating medium surrounding said reservoir.

3. Apparatus according to claim 1 in which said heat transfer means includes a coil of metal tubing disposed to form a storage battery receiving space and a heat insulating coating along the walls of said coil remote from said battery receiving space.

4. Apparatus according to claim 1 in which said heat transfer means includes a reservoir and heat-radiating fins disposed along the outer wall of said reservoir.

5. Apparatus according to claim 1 in which said heat transfer means is disposed at a height approximating the average height of said tray.

6. Apparatus according to claim 1 in which said tray, said heat transfer means and said tubing means are substantially filled with a liquid.

7. Apparatus according to claim 5 in which said fluid is ethylene glycol.

8. Apparatus according to claim 5 in which said fluid is water.

9. Apparatus as defined in claim 1 including, in addition, a storage battery coupled to said terminals and heated by said fluid.

10. Apparatus as defined in claim 1 in which said fluid comes in contact with a substantial portion of the surface area of said cells.

References Cited in the file of this patent

UNITED STATES PATENTS

| | | |
|---|---|---|
| 1,753,227 | Wheeler et al. | Apr. 8, 1930 |
| 2,544,474 | Swanton | Mar. 6, 1951 |
| 2,703,855 | Koch et al. | Mar. 8, 1955 |
| 2,780,765 | Chapin et al. | Feb. 5, 1957 |
| 2,823,245 | Solow | Feb. 11, 1958 |